US012252278B2

(12) United States Patent
Faers et al.

(10) Patent No.: US 12,252,278 B2
(45) Date of Patent: Mar. 18, 2025

(54) UNMANNED AERIAL VEHICLE (71) Applicant: BAYER AKTIENGESELLSCHAFT, Leverkusen (DE)

(72) Inventors: Malcolm Faers, Düsseldorf (DE); Andrew Charles Chapple, Langenfeld (DE)

(73) Assignee: BAYER AKTIENGESELLSCHAFT, Leverkusen (DE)

(*) Notice: Subject to any disclaimer, the term of this patent is extended or adjusted under 35 U.S.C. 154(b) by 261 days.

(21) Appl. No.: 17/910,336

(22) PCT Filed: Feb. 25, 2021

(86) PCT No.: PCT/EP2021/054632
§ 371 (c)(1),
(2) Date: Sep. 8, 2022

(87) PCT Pub. No.: WO2021/180474
PCT Pub. Date: Sep. 16, 2021

(65) Prior Publication Data
US 2023/0135631 A1 May 4, 2023

(30) Foreign Application Priority Data
Mar. 12, 2020 (EP) .................................... 20162573

(51) Int. Cl.
B64U 10/80 (2023.01)
B64U 20/87 (2023.01)
(Continued)

(52) U.S. Cl.
CPC ............ B64U 10/80 (2023.01); B64U 30/299 (2023.01); B64U 80/30 (2023.01); B64U 20/87 (2023.01);
(Continued)

(58) Field of Classification Search
CPC ...... B64U 10/80; B64U 30/299; B64U 80/30; B64U 80/40; B64U 20/87; B64U 2101/40; B64U 2101/60; B64U 2101/30
See application file for complete search history.

(56) References Cited

U.S. PATENT DOCUMENTS 9,807,996 B1 11/2017 Yu
2014/0163781 A1 6/2014 Vian et al.
(Continued)

FOREIGN PATENT DOCUMENTS

WO WO2014/160589 A1 10/2014
WO WO2016/123201 A1 8/2016
(Continued)

Primary Examiner — Michael D Lang
(74) Attorney, Agent, or Firm — Harness, Dickey & Pierce, P.L.C.

(57) ABSTRACT

The present invention relates to an unmanned aerial vehicle (UAV) for agricultural weed management. The UAV comprises a control and processing unit (20), and a camera (30). The control and processing unit is configured to control the UAV to fly to a location inside the canopy of a crop and below the vertical height of the crop and/or between a row of a plurality of crops and below the vertical height of the plurality of crops. The control and processing unit is configured to control the camera to acquire at least one image relating to the ground at the location inside the canopy of a crop and below the vertical height of the crop and/or between a row of a plurality of crops and below the vertical height of the plurality of crops. The control and processing unit is configured to analyse the at least one image to determine the presence of at least one weed and its location on the ground.

15 Claims, 6 Drawing Sheets (51) Int. Cl.
    *B64U 30/299*    (2023.01)
    *B64U 80/30*     (2023.01)
    *B64U 80/40*     (2023.01)
    *B64U 101/30*    (2023.01)
    *B64U 101/40*    (2023.01)
    *B64U 101/60*    (2023.01)
(52) U.S. Cl.
    CPC .......... *B64U 80/40* (2023.01); *B64U 2101/30* (2023.01); *B64U 2101/40* (2023.01); *B64U 2101/60* (2023.01)

(56) References Cited

U.S. PATENT DOCUMENTS

| | | |
|---|---|---|
| 2018/0068164 A1 | 3/2018 | Cantrell et al. |
| 2020/0034616 A1 | 1/2020 | Lindberg et al. |
| 2020/0368912 A1* | 11/2020 | Murty .................... G06V 20/13 |

FOREIGN PATENT DOCUMENTS

| | | |
|---|---|---|
| WO | WO2018/033925 A1 | 2/2018 |
| WO | WO2019/076758 A1 | 4/2019 |
| WO | WO2019/076759 A1 | 4/2019 |
| WO | WO2019/101557 A1 | 5/2019 |

\* cited by examiner

UNMANNED AERIAL VEHICLE

CROSS-REFERENCE TO RELATED APPLICATIONS

This application is a U.S. national stage filing under 35 U.S.C. § 371 of International Application No. PCT/EP2021/054632, filed on Feb. 25, 2021, which claims the benefit of, and priority to, European Patent Application No. 20162573.8, filed on Mar. 12, 2020. The entire disclosure of each of the above applications is incorporated herein by reference.

FIELD OF THE INVENTION

The present invention relates to an unmanned aerial vehicle (UAV) for agricultural weed management, to a base station, a system and to a method for agricultural weed management, as well as to a computer program product.

BACKGROUND OF THE INVENTION

The general background of this invention is the assessing and managing an agricultural field in terms of weeds. Presently remote sensing and unmanned aerial vehicles (UAVs) such as drones do not acquire imagery at the required resolution and quality in order to perform the required image diagnostics.

WO2019/076758A1 proposes an UAV that is configured to hover in a stationary position above the crop, then a camera is lowered toward the crop and can be lowered into the crop canopy to acquire images. The disadvantage of this solution is that the downwash of the propellers of this UAV setup generates a significant leaf movement in the crop canopy at the imaging point. Furthermore, the camera can get easily entangled in crowded canopies. In addition, raising and lowering the camera from the UAV is slowing down the process of field scouting which makes it very time consuming to acquire the necessary image data.

SUMMARY OF THE INVENTION

It would be advantageous to have improved means for agricultural weed management.

The object of the present invention is solved with the subject matter of the independent claims, wherein further embodiments are incorporated in the dependent claims. It should be noted that the following described aspects and examples of the invention apply also for the unmanned aerial vehicle for agricultural weed management, the base station, the system and the method for agricultural weed management, and for the computer program product.

According to a first aspect, there is provided an unmanned aerial vehicle (UAV) for agricultural weed management. The UAV comprises a control and processing unit, and a camera. The control and processing unit is configured to control the UAV to fly to a location inside the canopy of a crop and below the vertical height of the crop and/or between a row of a plurality of crops and below the vertical height of the plurality of crops. The control and processing unit is configured to control the camera to acquire at least one image relating to the ground at the location inside the canopy of a crop and below the vertical height of the crop and/or between a row of a plurality of crops and below the vertical height of the plurality of crops. The control and processing unit is configured to analyse the at least one image to determine the presence of at least one weed and its location on the ground.

In other words, the UAV flies close to a crop to allow proximal sensing of weeds. In this manner, the UAV is able to generate a precise and accurate weed map of the agricultural crop field.

The UAV can acquire data by random scouting around a field. The UAV can also determine itself from image processing where to position itself to acquire data, or could be directed to a location by a user. As the UAV can fly through the canopy acquiring more information in a shorter time compared to other technical solutions such as those proposed in WO2019/076758A1, the UAV (or a plurality of similar UAVs) can acquire weed images and generate a weed map for a whole field economically.

In an example, the at least one image comprises a plurality of images and wherein the processing and control unit is configured to control the camera to acquire the plurality of images at a corresponding plurality of different positions relative to the ground inside the canopy of a crop and below the vertical height of the crop and/or between a row of a plurality of crops and below the vertical height of the plurality of crops.

In other words, by acquiring images at various heights and locations within the canopy of a crop and/or between a row of a plurality of crops increases the granularity of the weed map.

In an example, the control and processing unit is configured to analyse the at least one image to determine a weed map, wherein the weed map classifies the presence of weeds on the ground according to their density and spatial distribution.

In other words, the images are used to analyse the frequency of weed on the crop field and their zonal structure. This helps to identify whether weeds are evenly distributed, present in patches or whether single weed plants are randomly distributed on the field.

In an example, the UAV has a size in the order of magnitude of 1 to 20 cm, preferably 2 to 10 cm, more preferably from 4 to 8 cm, and a weight equal or below 200 g, preferably equal or below 100 g, more preferably equal or below 50 g.

Thus, the UAV has a small size for optimal liberty of action within the canopy and between crop rows below the vertical height of the crops. When flying within the canopy such an UAV is less susceptible to wind disturbance as the crops at least partly shield the UAV from such impacts. In addition, because of the small size and weight of the UAV, the safety is higher, for example in the case of unwanted accidental collisions.

In an example, the UAV comprises propeller guards. The propeller guards are configured to at least partially surround the propellers of the UAV and preferably fully encircle the propellers.

In this manner, the propellers are e.g. protected from flapping leaves which can otherwise potentially intercept with the rotational movement of the propellers.

In an example, the UAV comprises at least one weed control unit. The at least one weed control unit is configured to be activated at a location determined by the control and processing unit based on the image analysis for the presence of at least one weed and its location.

Thus, the UAV can acquire images, analyze images and control weeds e.g. by applying appropriate herbicide in one operational sequence. This is more efficient in comparison to solutions as proposed in WO2019/076758A1. In addition, the UAV with the at least one weed control unit is closer to the target weeds which offers a greater accuracy in the application of a herbicide to the target. A second advantage is that the ground effect reduces the energy required for flight and enhances the range of the UAV.

In an example, the UAV comprises location determining means. The location determining means is configured to provide the control and processing unit with at least one location associated with the camera when the at least one image relating to the ground was acquired.

In an example, the UAV comprises a transceiver. The control and processing unit is configured to utilize the transceiver to transmit information about the at least one image relating to the ground and/or the image analysis of at least one image relating to the ground, and the at least one location associated with the camera when the at least one image relating to the ground was acquired. The control and processing unit is configured to receive an instruction to fly to at least one location where at least one weed has been determined and to activate the at least one weed control unit at the at least one location. The instruction is based on the at least one image relating to the ground and/or the image analysis of at least one image relating to the ground as transmitted by the transceiver.

In other words, the UAV transmits information about the acquired image and the position where it has been acquired to another processing unit located e.g. at the base station such as a carrier vehicle. The base station has a larger size and more processing capacity and is able to receive image information from a plurality of UAVs in the field. The base station does coordinate the flight paths of the plurality of UAVs and sends instructions to UAVs to fly to locations where the control of weeds is required. Optimal flight paths are calculated by taking into account various aspects of the UAV such as the energy level of the UAV, type of control unit, the remaining capacity of the control unit to control a certain weed problem, the distance between the location of the UAV and the location where a weed problem has been identified etc. In this way, also "specialization" of different UAVs on the crop field (e.g. one UAV entirely dedicated for scouting weeds on the ground, another entirely dedicated to weed control etc.) can be considered by the control and processing unit of the base station when calculating appropriate flight paths.

According to a second aspect, there is provided a base station for a plurality of UAVs. The base station comprises an UAV parking unit comprising at least one UAV, a control and processing unit, and at least one transceiver. The at least one UAV comprises a control and processing unit, a camera, and a transceiver. The UAV parking unit of the base station is configured to carry a plurality of UAVs. The control and processing unit of the UAV is configured to control the UAV to fly from the base station to a location within the canopy of a crop and below the vertical height of the crop and/or between a row of a plurality of crops and below the vertical height of the plurality of crops. The control and processing unit of the UAV is configured to control the camera to acquire at least one image relating to the ground at the location within the canopy of a crop and below the vertical height of the crop and/or between a row of a plurality of crops and below the vertical height of the plurality of crops. The control and processing unit of the UAV is configured to utilize the transceiver to transmit information about the at least one image relating to the ground to a base station. The control and processing unit of the base station is configured to utilize the transceiver to receive information about the at least one image relating to the ground from at least one UAV.

The control and processing unit of the base station is configured to analyse the at least one image received from the at least one UAV to determine the presence of at least one weed and its location on the ground.

Thus, if the UAV as a small size and limited capacity to process the acquired image information it can send the image information via wireless communication to a base station. The base station has more processing capacity. The base station receives the image scouting data of the small UAVs and has the capacity to do in-depth image analysis e.g. with artificial intelligence algorithms to identify weed issues on the crop field.

In an example, the base station for a plurality of UAVs comprises at least one UAV. The at least one UAV further comprises location determining means. The location determining means is configured to provide the control and processing unit of the UAV with at least one location associated with the camera when the at least one image relating to the ground was acquired. The control and processing unit of the UAV is configured to utilize the transceiver to transmit information of at least one location associated with the camera when the at least one image relating to the ground was acquired. The control and processing unit of the base station is configured to utilize the transceiver to receive information of at least one location associated with the camera when the at least one image relating to the ground was acquired. The control and processing unit of the base station is configured to analyse the at least one image received from the at least one UAV to determine the presence of at least one weed on the ground at the at least one location.

In an example, the base station for a plurality of UAVs comprises at least one UAV. The at least one UAV further comprises at least one weed control unit. The control and processing unit of the base station is further configured to determine an instruction to at least one UAV to fly to the at least one location where the presence of at least weed has been determined and to activate the at least one weed control unit at the at least one location.

In an example, base station for a plurality of UAVs comprises an UAV parking unit with a plurality of UAV. The control and processing unit of the base station is configured to analyse the at least one image received from at least one UAV to determine a weed map. The weed map classifies the presence of weeds on the ground according to their density and spatial distribution. The control and processing unit of the base station is further configured to determine a flight path map for a plurality UAVs as a function of the weed map and the classification of the weeds according to their density and spatial distribution on the ground.

The control and processing unit of the base station is further configured to determine instructions to a plurality of UAVs to fly to the at least one location where the presence of at least weed has been determined and to activate the at least one weed control unit at the at least one location according to the determined flight path map.

Thus, the control and processing unit of the base station coordinates the activities of the plurality of UAVs. Depending on the weeds present on the agricultural field and the corresponding weed map it can instruct the plurality of UAVs to control the weeds in different ways. For example, application can be performed patch-wise, as parallel strips, or by a target to target approach. A high number of weeds with even distribution favors a strip application strategy while a low number of weeds favors a target to target application strategy. Also, the presence of patches of weeds allows a patch-based strategy where only certain areas of the field are treated with the weed control unit of an UAV. The control and processing unit of the base station decides which is the optimum strategy and determines flight plans for the plurality of UAVs to treat the agricultural field in the optimum way.

In an example, the base station for a plurality of UAVs comprises a control and processing unit which is configured to control the plurality of UAVs to operate in alternating groups such that while one group is out flying the other group is on the UAV parking unit.

In other words, while one group of UAVs is flying on the crop field and controlling the weeds, the other group is on the base station and preferably gets a service by the service unit such as a recharge of the batteries and/or a refill of the spray tank.

According to a third aspect, there is provided a system for agricultural weed management. The system comprises a base station for a plurality of UAVs. The base station comprises an UAV parking unit comprising at least one UAV, a control and processing unit, and at least one transceiver. The at least one UAV comprises a control and processing unit, a camera, and a transceiver. The UAV parking unit is configured to carry a plurality of UAV. The control and processing unit of the UAV is configured to control the UAV to fly from the base station to a location within the canopy of a crop and below the vertical height of the crop and/or between a row of a plurality of crops and below the vertical height of the plurality of crops. The control and processing unit of the UAV is configured to control the camera to acquire at least one image relating to the ground at the location within the canopy of a crop and below the vertical height of the crop and/or between a row of a plurality of crops and below the vertical height of the plurality of crops. The control and processing unit of the UAV is configured to utilize the transceiver to transmit information comprising information about the at least one image relating to the ground to the base station. The control and processing unit of the base station is configured to utilize the transceiver to receive information about the at least one image relating to the ground of at least one UAV. The control and processing unit of the base station is configured to analyse the at least one image received from the at least one UAV to determine the presence of at least one weed and its location on the ground.

According to a fourth aspect, there is provided a method for agricultural weed management, comprising:
  a) flying an UAV to a location within the canopy of a crop and below the vertical height of the crop and/or between a row of a plurality of crops and below the vertical height of the plurality of crops;
  b) acquiring by the camera at least one image relating to the ground at the location within the canopy of a crop and below the vertical height of the crop and/or between a row of a plurality of crops and below the vertical height of the plurality of crops;
  c) analysing the at least one image to determine at least one weed and its location on the ground.

In a fifth aspect, there is provided a computer program product for controlling an UAV of the first aspect which when executed by a processor is configured to carry out the method of the fourth aspect.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings:

FIG. 6 *a*) to *c*) show schematic examples of a plurality of UAVs applying herbicides to an agricultural crop field according to different weed maps.

DETAILED DESCRIPTION OF EMBODIMENTS

Figure 1:
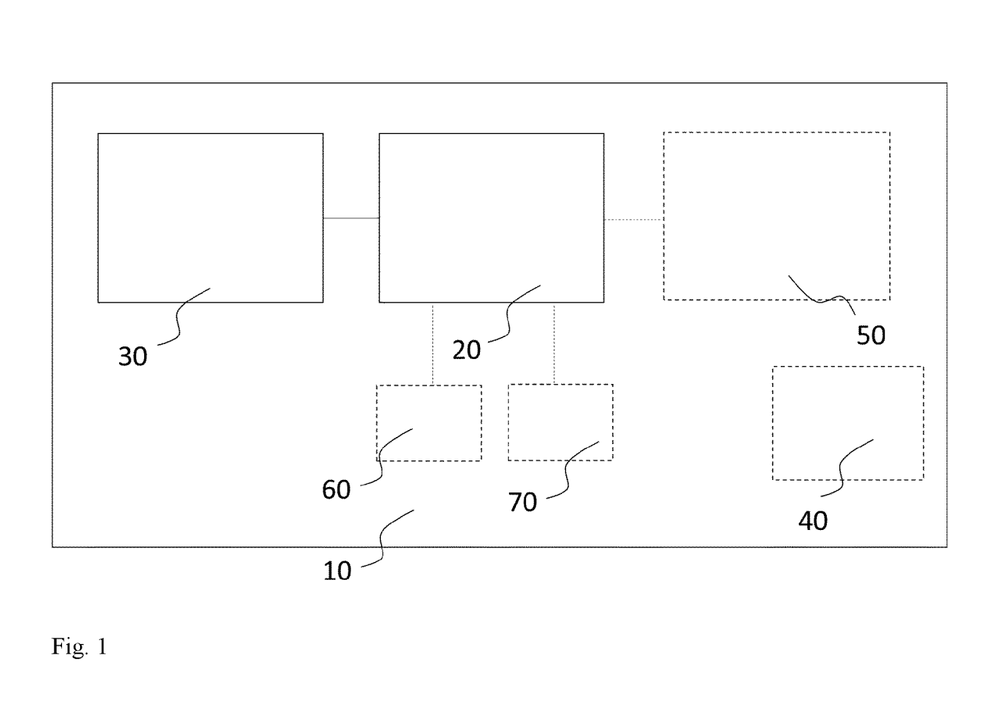
FIG. 1 shows a schematic set up of an example of an UAV for agricultural weed management.

FIG. 1 shows an example of an unmanned aerial vehicle (UAV) 10 for agricultural weed management. The UAV comprises a control and processing unit 20, and a camera 30. The control and processing unit is configured to control the UAV to fly to a location inside the canopy of a crop and below the vertical height of the crop and/or between a row of a plurality of crops and below the vertical height of the plurality of crops. The control and processing unit is configured to control the camera to acquire at least one image relating to the ground at the location inside the canopy of the crop and below the vertical height of the crop and/or between a row of a plurality of crops and below the vertical height of the plurality of crops. The control and processing unit is configured to analyse the at least one image to determine the presence of at least one weed and its location on the ground.

In an example, the term "agricultural weed management" refers to the field scouting activity to identify weeds on the ground on the agricultural field. In the presence of at least one weed control unit 50, the term also includes the control activity of the identified weeds.

In an example, a location inside the canopy of a crop and below the vertical height of the crop refers to a location inside and/or next to the spatial arrangement (three-dimensional geometry) of the aboveground part of a crop plant but not at a height which is above the crop plant.

In an example, a location between a row of a plurality of crops and below the vertical height of the plurality of crops refers to a location which is between the crop canopies in different rows but not at a height which is above the crop plants. It is possible that the crop canopies partially overlap at the top and that the UAV flies underneath.

In an example, the camera comprises a normal imaging sensor useable to image the ground at a resolution to enable image processing to determine at least one weed.

In an example, the camera is a 360 degree all around camera, or a camera that can image substantially 360 degrees.

In an example, the camera is configured to operate over the visible wavelength range. In an example, the camera is configured to operate in the near infrared range. In an example, the camera is monochromatic. In an example, the camera is configured to acquire colour information such RGB. In an example, the camera is configured to acquire hyperspectral information. In this way, the analysis of the imagery to automatically detect at least one weed can be improved.

In an example, the camera further comprises a light source, which can also be multispectral, to support the acquisition of images.

In an example, the control and processing unit is configured to analyse the at least one image to determine at least one type of weed.

In an example, image analysis of the at least one image comprises utilisation of a machine learning algorithm. This applies to the image processing to determine at least one weed.

In an example, the machine learning algorithm comprises a decision tree algorithm.

In an example, the machine learning algorithm comprises an artificial neural network.

In an example, the machine learning algorithm has been taught on the basis of a plurality of images. In an example, the machine learning algorithm has been taught on the basis of a plurality of images containing imagery of at least one type of weed on the ground.

In an example, the machine learning algorithm has been taught on the basis of a plurality of images containing such imagery.

Therefore, the control and processing unit can run image processing software that comprises a machine learning analyser. E.g. Images of specific weeds on the ground are acquired, with information also relating to the size of the weeds. Information relating to a geographical location in the world, where such a weed is to be found and information relating to a time of year when that weed is to be found. The names of the weed can also be tagged with the imagery of the weed. The machine learning analyser, which can be based on an artificial neural network or a decision tree analyser, is then trained on this acquired imagery. In this way, when a new image of a ground is presented to the analyser, where such an image can have an associated time stamp such as time of year and a geographical location tagged to it, the analyser determines the specific type of weed that is in the image through a comparison of imagery of a weed found in the new image with imagery of different weeds it has been trained on, the size of weed, and where and when they grow can also be taken into account. The specific location of that weed type on the ground, and its size, can therefore be determined. The control and processing unit has access to a database containing different weed types. This database has been compiled from experimentally determined data.

In an example, the imagery analysis comprises the identification of bird or small mammal nesting sites and its locations (for their future protection).

In an example, the term "crop" refers an orchard crop plant and or an arable crop plant and preferably to an arable crop plant. An orchard crop is selected from the group of apple, pear (European and Asian), grapevine, stone fruit such as peach, nectarine, plum, apricot, pluot, prune, persimmon, cherry, semi-tropical crops such as mango, avocado, olive, citrus, orange, lemon, lime, tangerine, grapefruit, kiwi, tangelo, kumquat, calamondin, Javanese pomelo, fig, date, nuts crops such as almond, pecan, pistachio, walnut, filbert, hazelnut and chestnut. An arable crop plant refers to grain crops such as wheat, maize (corn), rice, barley, millet, oats, rye, pulse crops such as lentil, beans, peas, oil seed crops such as rapeseed, soybean, sunflower, linseed, fibre crops such as cotton, jute, flax, vegetable crops such as tomato, peppers, potatoes, pumpkin, garlic, onions, leeks, carrot, celery, sugar beet, beetroot, spinach, lettuce, clover, cabbage, brussels sprouts, broccoli, cauliflower, turnips, cucumber, fruit crops such as melon, water melon, strawberry, raspberry, blueberry, pineapple, banana, flower crops such as lilies, orchids, tulips and other crops such as peanut, sugar cane, cocoa, coffee and tea.

More preferred crops are crops that are planted in rows such as sugar cane, maize (corn), soybean, rapeseed, sunflower, cotton, potato, tomato, pepper, cucumber, onion, wheat, barley, rice, grapevine, peanut, banana, cocoa and coffee.

In an example, the width (distance) between two rows of planted crops is between 10 cm to 2 meters, more preferably between 50 cm and 1.5 meters.

In an example, the crops have a height of between 20 cm to 10 meters, preferably 20 cm to 5 meters and more preferably from 50 cm to 3.5 meters.

According to an example, the at least one image comprises a plurality of images and the processing and control unit is configured to control the camera to acquire the plurality of images at a corresponding plurality of different positions relative to the ground inside the canopy of a crop and below the vertical height of the crop and/or between a row of a plurality of crops and below the vertical height of the plurality of crops.

According to an example, the control and processing unit is configured to analyse the at least one image to determine a weed map, wherein the weed map classifies the presence of weeds on the ground according to their density and spatial distribution.

In an example, at least one image acquired from an UAV above the crop canopy can be used as well to determine the weed map.

In an example, the control and processing unit is configured to analyse the at least one image to determine a weed map, wherein the weed map classifies the presence of weeds on the ground according to their density, spatial distribution and according to their typology.

In an example, the density of weeds refers to the number of weed plants per $m^2$.

In an example, the spatial distribution of weeds refers to degree of agglomeration of weeds on certain locations on the agricultural field. E.g. the spatial pattern of weeds can be scattered (single individual plants are distributed randomly on the field) or clustered (weeds form patches on the field). In addition, the spatial distribution of weeds can be dense and distributed uniform, e.g. between a row of a plurality of crops.

According to an example, the UAV has a size in the order of magnitude of 1 to 20 cm, preferably 2 to 10 cm, more preferably from 4 to 8 cm, and a weight equal or below 200 g, preferably equal or below 100 g, more preferably equal or below 50 g.

According to an example, the UAV comprises propeller guards 40. The propeller guards are configured to at least partially surround the propellers of the UAV, preferably fully encircle the propellers.

In an example, the propeller guards can be made from strong lightweight material, and can be either molded as a three dimensional shape, or assembled to a three dimensional structure from a thin strip of material.

In an example, the propellers of the UAV are counter-rotating propellers.

In an example, the camera is mounted on an extendable and retractable mount on the UAV. The mount is configured to vary the distance between the camera and the body of the UAV.

In an example, the camera is mounted on a telescopic extendable and retractable mount on the UAV.

In an example, the UAV comprises a distance sensor configured to measure the distance between the extendable and retractable mount relative to the weed.

In an example, the control and processing unit of the UAV is configured to utilize the information of the distance sensor to avoid collision of the UAV respectively the extendable and retractable mount of the UAV with the weed and/or crop plant.

In an example, the UAV comprises a distance sensor preferably selected from the group of LiDAR sensor, a parallax laser rangefinder sensor, a stereo vision sensor, an IR reflectance sensor, a time of flight sensor, an ultrasonic sensor, and a radar sensor.

In an example, the UAV comprises a LiDAR sensor as a distance sensor. The distance sensor is used to guide the UAV in particular in areas with little space such as within the canopy of a crop plant and supports the avoidance of collision.

According to an example, the UAV comprises at least one weed control unit 50. The at least one weed control unit is configured to be activated at a location determined by the control and processing unit based on image analysis for the presence of at least one weed and its location.

In an example, the at least one weed control unit comprises at least one spray unit. The at least one spray unit is configured to spray a liquid.

In an example, a spray unit is positioned (or can with an extendable mount be positioned) in front of the downdraft from the propellers of the UAV to avoid interference.

In an example, the term "activate" in the context of a spray unit refers to the initiation of the spraying process.

In an example, a spray unit comprises at least one liquid atomizer such as a hydraulic nozzle and/or at least one atomizing disc such as a spinning disc.

In an example, the at least one weed control unit comprises a, liquid atomizer, a liquid tank and at least one feed pipe. The liquid tank is configured to hold a chemical. The feed pipe is configured to transport the liquid from the liquid tank to the liquid atomizer. The liquid atomizer is configured to spray the liquid.

In an example, the liquid tank has a liquid volume capacity of 0.1 ml to 800 ml, preferably 0.5 ml to 100 ml.

In an example, the term "liquid(s)" refer(s) to liquid(s) comprising chemical and/or biological based agricultural herbicide(s).

In an example, the term "liquid(s)" also comprises one or more adjuvants to be applied by the at least one spray unit to enhance the retention and biodelivery of the chemical and/or biological based agricultural herbicide on the target weeds. These can be combined with the chemical and/or biological based agricultural herbicides either prior to a spray unit or within a spray unit.

In an example, the control and processing unit is configured to control the UAV to fly at a flight height above the ground less than 0.8 metres (more preferably less than 0.4 metres) when the at least one spray unit has been activated.

In an example, the control and processing unit is configured to activate the at least one spray unit to apply the liquid either as a spray of fine droplets, a single jet, a single droplet, or a combination of these, depending on the preferred type of deposit.

In an example, the control and processing unit is configured to adjust the liquid volume to be applied to the target by at least one spray unit depending on the size of the target.

In an example, the control and processing unit is configured to control the UAV to fly and to activate the at least one spray unit to achieve a strip, patch and target to target spray application on the agricultural field, or combinations of these.

In an example, the control and processing unit is configured to control the UAV to fly and to activate the at least one spray unit to apply liquids in spray application patterns within the crop to minimise the spread of the weeds.

In an example, the at least one weed control unit is mounted on at least one extendable and retractable mount on the UAV. The at least one mount is configured to vary the distance between the at least one weed control unit and the body of the UAV.

In an example, the at least one weed control unit is mounted on at least one telescopic extendable and retractable mount on the UAV.

In an example, the UAV comprises a distance sensor configured to measure the distance between the extendable and retractable mount relative to the weed. Useful distance sensors are discussed herein above in more detail.

In an example, the control and processing unit of the UAV is configured to utilize the information of the distance sensor to avoid collision of the UAV respectively the extendable and retractable mount of the UAV with the weed target.

According to an example, the UAV comprises location determining means 80. The location determining means 60 is configured to provide the control and processing unit 20 with at least one location associated with the camera when the at least one image relating to the ground was acquired.

The location can be a geographical location, with respect to a precise location on the ground, or can be a location on the ground that is referenced to another position or positions on the ground, such as a boundary of a field or the location of a base station. In other words, an absolute geographical location can be utilized or a location on the ground that need not be known in absolute terms, but that is referenced to a known location can be used.

In an example, the location is an absolute geographical location.

In an example, the location is a location that is determined with reference to a known location or locations.

In other words, an image can be determined to be associated with a specific location on the ground, without knowing its precise geographical position, but by knowing the location where an image was acquired with respect to known position(s) on the ground the location where imagery was acquired can be logged. In other words, absolute GPS derived locations of where the UAV has acquired imagery of a ground could be provided, and/or the locations of where imagery was acquired relative to a known position such as a field boundary or position of a base station for the UAV could be provided, which again enables the control and processing unit to determine the exact positions where imagery was acquired because they would know the absolute position of the filed boundary or charging station.

In an example, a GPS unit is used to determine, and/or is used in determining, the location, such as the location of the camera when specific images were acquired.

In an example, an inertial navigation unit is used alone, or in combination with a GPS unit, to determine the location, such as the location of the camera when specific images were acquired. Thus for example, the inertial navigation unit, comprising for example one or more laser gyroscopes, is calibrated or zeroed at a known location (such as a base station) and as it moves with the at least one camera the movement away from that known location in x, y, and z coordinates can be determined, from which the location of the at least one camera when images were acquired can be determined.

According to an example, the UAV comprises a transceiver (70). The control and processing unit is configured to utilize the transceiver to transmit information about the at least one image relating to the ground and/or the image analysis of at least one image relating to the ground, and the at least one location associated with the camera when the at least one image relating to the ground was acquired. The control and processing unit is configured to receive an instruction to fly to at least one location where at least one weed has been determined and to activate the at least one weed control unit 50 at the at least one location. The instruction is based on the at least one image relating to the ground and/or the image analysis of at least one image relating to the ground as transmitted by the transceiver.

Thus, the UAV acquires imagery that is sent (optionally together with a basic image analysis) to one or more processors external to the UAV, and in-depth image analysis is undertaken there. The external processor may receive imagery from a plurality of different UAVs (and locations) and can calculate a plurality of flight targets and optimal flight paths to the identified flight targets while interference between adjacent UAVs is minimized. Flight path information is provided to an individual UAV which uses this information to fly to the identified target and activate the at least one weed control unit.

In an example, the UAV comprises a multispectral light source. Such a light source may aid in the identification of weeds (within the canopy there is less light available), as well as aid navigation during flight, including at dawn, dusk and night.

In an example, the UAV comprises at least one additional sensor such as a thermal camera, a sensor to measure soil moisture, and a sensor to measure soil temperature. Data from such sensors are useful in planning weed control operations as such factors have an impact on weed and crop growth. Other sensors may relate to a direction sensor, an orientation sensor, a height sensor, a battery power sensor and position sensor relative to the base station, sound sensor etc.

Figure 2:
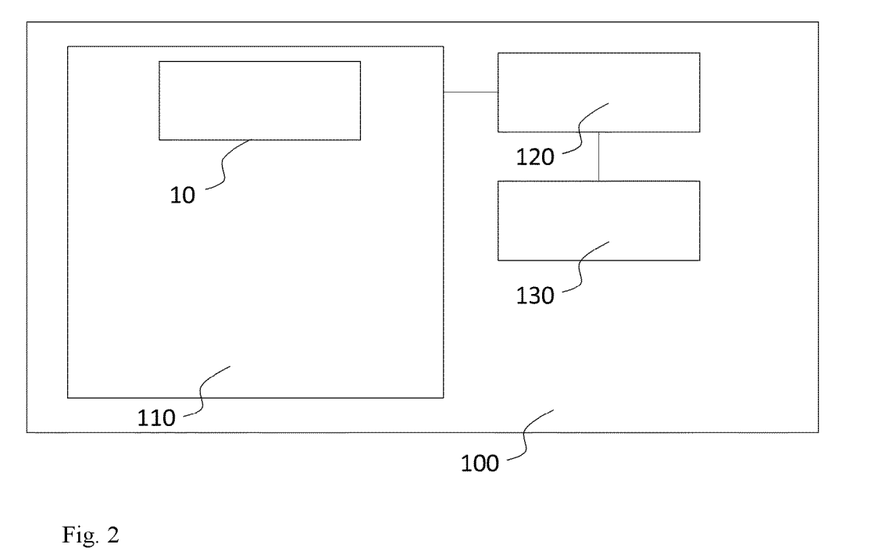
FIG. 2 shows a schematic set up of an example of a base station for a plurality of UAVs.
Figure 3:
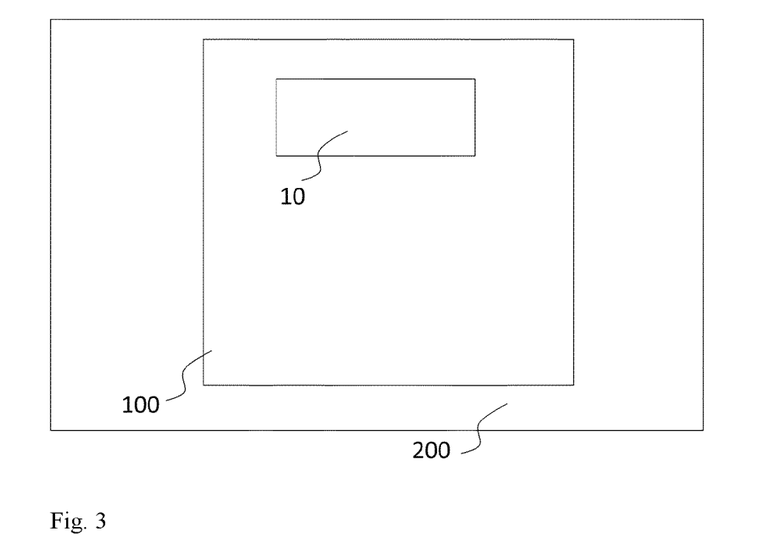
FIG. 3 shows a schematic example of a system for agricultural weed management.

FIG. 2 shows an example of a base station 100 for a plurality of UAVs 10. The base station comprises an UAV parking unit 110 comprising at least one UAV 10, a control and processing unit 120, and at least one transceiver 130. The at least one UAV comprises a control and processing unit 20, a camera 30, and a transceiver 70. The UAV parking unit is configured to carry a plurality of UAVs. The control and processing unit 20 is configured the UAV to fly from the base station to a location within the canopy of a crop and below the vertical height of the crop and/or between a row of a plurality of crops and below the vertical height of the plurality of crops. The control and processing unit 20 is configured to control the camera to acquire at least one image relating to the ground at the location within the canopy of a crop and below the vertical height of the crop and/or between a row of a plurality of crops and below the vertical height of the plurality of crops. The control and processing unit 20 is configured to utilize the transceiver 70 to transmit information about the at least one image relating to the ground to a base station. The control and processing unit 120 is configured to utilize the transceiver 130 to receive information about the at least one image relating to the ground from at least one UAV. The control and processing unit 120 is configured to analyse the at least one image received from the at least one UAV to determine the presence of at least one weed and its location on the ground.

In an example, a base station refers to a carrier vehicle which is an Unmanned Ground Vehicle (UGV), an UAV, a tractor, etc.

In an example, the base station is a UAV carrier vehicle.

In an example, an UAV carrier vehicle has typically a size of 0.5 to 2 m and the ability to carry a payload of several kg, preferably greater than 2 kg which would allow a payload of, for example, 40 UAVs with a weight of 50 g each, or 80 of 25 g each. A carrier vehicle could carry a mixture of different sized UAVs, for different purposes (e.g., different sized UAVs for field scouting and specialized UAVs for weed control).

In an example, an UAV carrier vehicle comprises at least one leg, preferably a plurality of legs. In an example, the leg(s) is/are extendable. Thus, the UAV carrier vehicle can e.g. land in the middle or at the boundary of crop fields without disturbing growing crops.

In an example, image analysis is done by the processing unit 120 of the base station 100. As there are not similar size limitations as for the UAV which flies within the crop canopy, the base station can have extensive processing power and analyses imagery of a plurality of UAVs. This is done in the same manner as discussed above.

In an example, the base station comprises a service unit. The service unit is configured to recharge the power unit (battery), to refill at least one liquid tank (if available) with liquid, to exchange of the at least one liquid tank with an at least partially filled liquid tank, to clean the spray unit, and/or to provide other necessary services for the UAV.

According to an example, the base station 100 comprises a plurality of UAVs 10. The UAV further comprises location determining means 60. The location determining means 60 is configured to provide the control and processing unit 20 with at least one location associated with the camera when the at least one image relating to the ground was acquired. The control and processing unit 20 is configured to utilize the transceiver 90 to transmit information of at least one location associated with the camera when the at least one image relating to the ground was acquired. The control and processing unit 120 is configured to utilize the transceiver 130 to receive information of at least one location associated with the camera when the at least one image relating to the ground was acquired. The control and processing unit 120 is configured to analyse the at least one image received from the at least one UAV to determine the presence of at least one weed on the ground at the at least one location.

According to an example, the base station 100 comprises a plurality of UAVs 10. At least one UAV further comprises at least one weed control unit 50. The control and processing unit 120 is further configured to determine an instruction to the at least one UAV to fly to the at least one location where the presence of at least one weed has been determined and to activate the at least one weed control unit at the at least one location.

In an example, the control and processing unit 120 is configured to analyse the previous liquid treatment history on the agricultural field to select a suitable liquid for spray application with a different mode of action to the immediate previous treatments to minimise the development of resistance and to determine an instruction to at least one UAV to fly to the at least one location where the presence of at least one weed has been determined and to activate the at least one spray unit at the at least one location.

In an example, the control and processing unit 120 is configured to identify a location where liquids are not working effectively, to select a suitable liquid for high resistance spray application and to determine an instruction to at least one UAV to fly to the at least one location and to activate the at least one spray unit at the at least one location.

In an example, the control and processing unit 120 is configured to identify UAVs that fail to spray a liquid to a target location and to determine an instruction to at least one another UAV to fly to the at least one target location and to activate the at least one spray unit at the at least one target location.

According to an example, the base station 100 for a plurality of UAVs comprises an UAV parking unit 110 with a plurality of UAV. The control and processing unit 120 is configured to analyse the at least one image received from at least one UAV to determine a weed map. The weed map classifies the presence of weeds on the ground according to their density and spatial distribution (and preferably also according to their typology). The control and processing unit 120 is further configured to determine a flight path map for a plurality UAVs as a function of the weed map and the classification of the weeds according to their density and spatial distribution on the ground. The control and processing unit 120 is further configured to determine instructions to a plurality of UAVs to fly to the at least one location where the presence of at least weed has been determined and to activate the at least one weed control unit 50 at the at least one location according to the determined flight path map.

In an example, a flight path map includes information about the activation and deactivation of the at least one weed control unit of an UAV.

In an example, a flight path map and the activation/deactivation of the at least one weed control unit along the flight path map of an UAV includes information about strip, patch, and target to target weed control operation activities, or combinations of these.

According to an example, the base station 100 for a plurality of UAVs 10 comprises UAVs, wherein the control and processing unit 120 is configured to control the plurality of UAVs to operate in alternating groups such that while one group is out flying the other group is on the UAV parking unit.

In an example, the UAVs on the parking unit get a service by the service unit of the base station.

In an example, the parking unit is an open landing bay configured to enable a plurality of UAVs to take off and land.

In an example, the parking unit is configured to park and lock/unlock a plurality of UAVs. Locking of an UAV is e.g. required during movement of the base station.

In an example, the base station 100 for a plurality of UAVs comprises at least one UAV with a multispectral camera configured to carry out observation of an agricultural field prior to the takeoff of the UAV(s) 10. The observation comprises the determination of scouting targets. The observation further comprises a calculation of how to effectively deploy the UAVs 10 to manage the agricultural field.

In an example, the base station 100 for a plurality of UAVs comprises at least one recovery UAV configured to recover any UAV 10 that are unable to return to the base station by themselves. This recovery UAV may comprise a robot arm configured to transport any UAV 10 back to the base station.

FIG. 3 shows a system 200 for agricultural weed management. The system 200 comprises a base station 100 for a plurality of UAVs 10. The base station 100 comprises a UAV parking unit 110 comprising at least one UAV, a control and processing unit 120, at least one transceiver 130. The at least one UAV 10 comprises a control and processing unit 20, a camera 30, and a transceiver 70. The UAV parking unit is configured to carry a plurality of UAV. The control and processing unit 20 is configured the UAV to fly from the base station to a location within the canopy of a crop and below the vertical height of the crop and/or between a row of a plurality of crops and below the vertical height of the plurality of crops. The control and processing unit 20 is configured to control the camera to acquire at least one image relating to the ground at the location within the canopy of a crop and below the vertical height of the crop and/or between a row of a plurality of crops and below the vertical height of the plurality of crops. The control and processing unit 20 is configured to utilize the transceiver 70 to transmit information comprising information about the at least one image relating to the ground to the base station. The control and processing unit 120 is configured to utilize the transceiver 130 to receive information about the at least one image relating to the ground of at least one UAV. The control and processing unit 120 is configured to analyse the at least one image received from the at least one UAV to determine the presence of at least one weed and its location on the ground.

In an example, the system 200 comprises a base station 100 for at least one UAV 10. The UAV further comprises location determining means 60. The location determining means 60 is configured to provide the control and processing unit 20 with at least one location associated with the camera when the at least one image relating to the ground was acquired. The control and processing unit 20 is configured to utilize the transceiver 70 to transmit information of at least one location associated with the camera when the at least one image relating to the ground was acquired. The control and processing unit 120 is configured to utilize the transceiver 130 to receive information of at least one location associated with the camera when the at least one image relating to the ground was acquired. The control and processing unit 120 is configured to analyse the at least one image received from the at least one UAV to determine the presence of at least one weed at the at least one location.

In an example, the system 200 comprises a base station 100 for a plurality of UAVs 10. At least one UAV further comprises at least one weed control unit 50. The control and processing unit 120 is further configured to determine an instruction to at least one UAV to fly to the at least one location where at least one weed has been determined and to activate the at least one weed control unit 50 at the at least one location.

FIG. 4 shows an example of a method for method 300 for agricultural weed management. The method comprises a flying step 310, also referred to as step a), flying an UAV to a location within the canopy of a crop and below the vertical height of the crop and/or between a row of a plurality of crops and below the vertical height of the plurality of crops;

In an acquiring step 320, also referred to as step b), acquiring by the camera at least one image relating to the ground at the location within the canopy of a crop and below the vertical height of the crop and/or between a row of a plurality of crops and below the vertical height of the plurality of crops;

In an analysing step 330, also referred to as step c), analysing the at least one image to determine at least one weed and its location on the ground.

In an example, in step b) acquiring a plurality of images and wherein the processing and control unit is configured to control the camera to acquire the plurality of images at a corresponding plurality of different positions relative to the ground inside the canopy of a crop and below the vertical height of the crop and/or between a row of a plurality of crops and below the vertical height of the plurality of crops.

In an example, in step c), analyzing the at least one image to determine a weed map, wherein the weed map classifies the presence of weeds on the ground according to their density and spatial distribution.

In an example, in step a), flying an UAV to a location within the canopy of a crop and below the vertical height of the crop and/or between a row of a plurality of crops and below the vertical height of the plurality of crops, wherein the UAV has a size in the order of magnitude of 1 to 20 cm, preferably 2 to 10 cm, more preferably from 4 to 8 cm, and a weight equal or below 200 g, preferably equal or below 100 g, more preferably equal or below 50 g.

In an example, in step a), flying an UAV to a location within the canopy of a crop and below the vertical height of the crop and/or between a row of a plurality of crops and below the vertical height of the plurality of crops, wherein the UAV comprises propeller guards, wherein the propeller guards are configured to at least partially surround the propellers of the UAV, preferably fully encircle the propellers.

Figure 4:
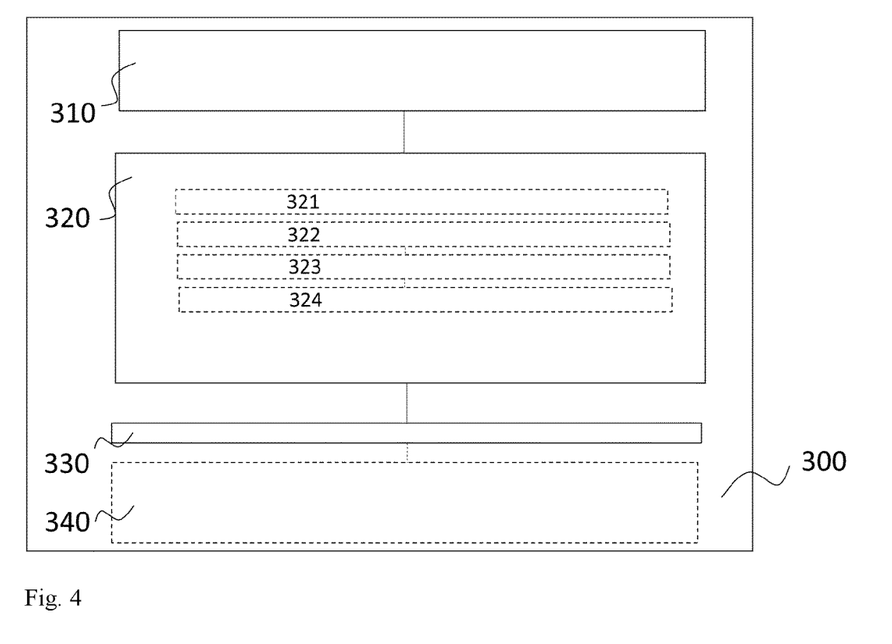
FIG. 4 shows a schematic example of a method for agricultural weed management.

In an example, in an activating step 340, also referred to as step d), activating at least one weed control unit of the UAV at a location determined by the control and processing unit based on image analysis of at least one image relating to the ground.

In an example, in step a) flying an UAV to a location within the canopy of a crop and below the vertical height of the crop and/or between a row of a plurality of crops and below the vertical height of the plurality of crops, wherein the UAV comprises location determining means,
  in an acquiring step 321, also referred to as step b1), acquiring at least one image relating to the ground and providing the control and processing unit with at least one location associated with the camera when the at least one image relating to the ground was acquired.

In an example, in step a) flying an UAV to a location within the canopy of a crop and below the vertical height of the crop and/or between a row of a plurality of crops and below the vertical height of the plurality of crops, wherein the UAV comprises a transceiver, and location determining means,
  in an acquiring step 322, also referred to as step b2), acquiring at least one image relating to the ground and providing the control and processing unit with at least one location associated with the camera when the at least one image relating to the ground was acquired,
  in a transmitting step 323, also referred to as step b3), transmitting information about the at least one image relating to the ground and/or the image analysis of at least one image relating to the ground, and the at least one location associated with the camera when the at least one image relating to the ground was acquired,
  in a receiving step 324, also referred to as step b4), receiving an instruction to fly to at least one location where at least one weed has been determined and to activate the at least one weed control unit at the at least one location, wherein the instruction is based on the at least one image relating to the ground and/or the image analysis of at least one image relating to the ground as transmitted by the transceiver.

Figure 5:
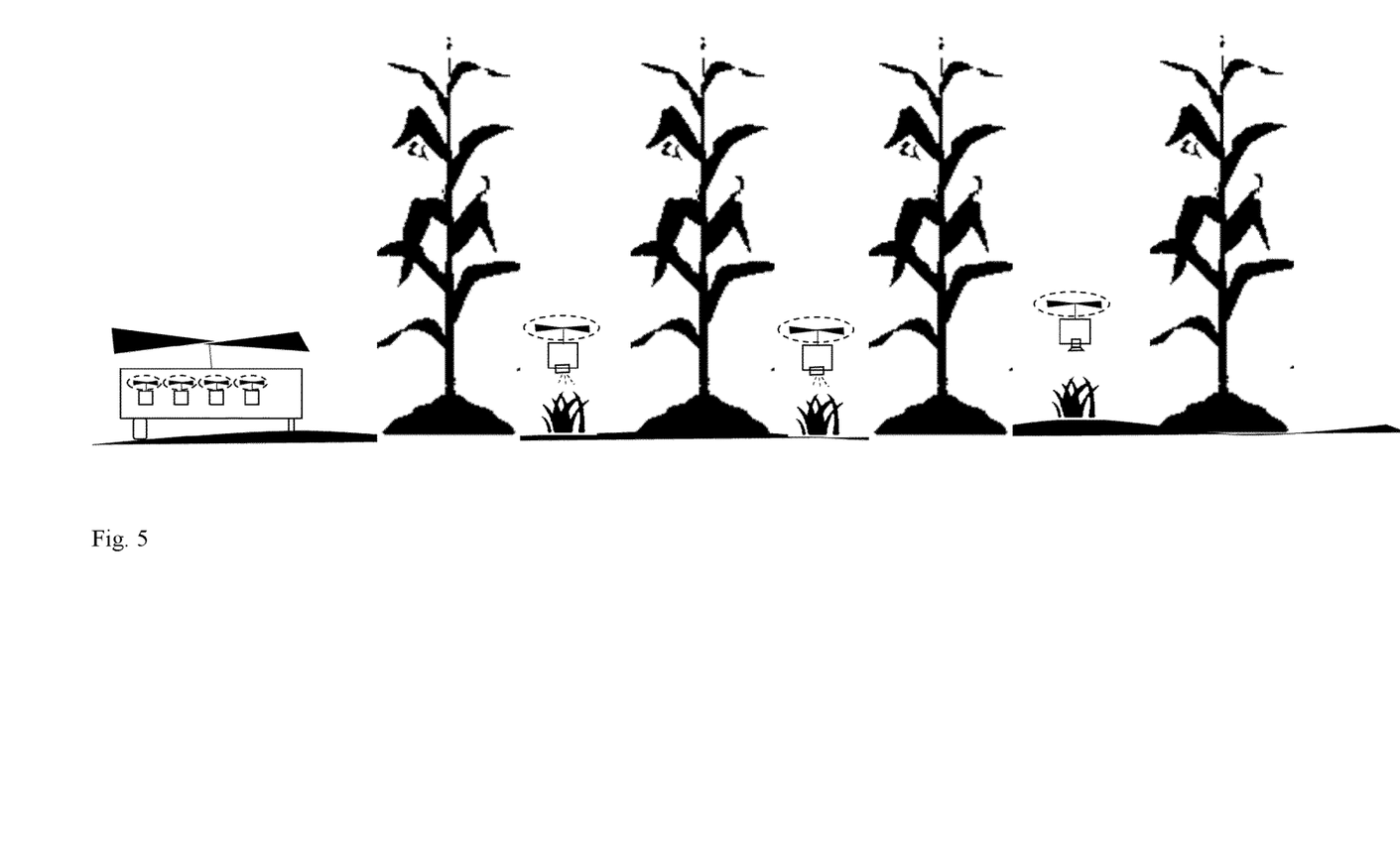
FIG. 5 shows a schematic representation of a detailed example of a base station (UAV carrier vehicle) and a plurality of UAVs on an agricultural field.

FIG. 5 shows a schematic representation of a detailed example of a base station and a plurality of UAV on an agricultural field. In this figure the base station is a UAV carrier vehicle, that carries a number of small UAVs. The carrier vehicle is able to fly UAVs to an agricultural field and land, park, or hover. Once at the agricultural field, the UAV carrier vehicle can launch the small UAVs which can fly across the field to detect weeds on the ground in an optimised flight pattern. The UAVs can apply herbicides locally as required. The small UAVs fly both above and inside the crop canopy, or between rows of crops such as in vineyards, identify weeds on the ground, and locally apply herbicides to control these weeds. In FIG. 5 on the right side an UAV (with camera; propellers protected with propeller guards) acquires images of weeds on the ground. The two small UAVs (with a spray unit; propellers protected with propeller guards) in the middle of the figure apply herbicide via spot-spraying to the weeds on the ground. The control and processing unit can decide on the appropriate herbicides to apply based on the information received from the camera and associated sensors (e.g. depending on the type of weed detected). A particular advantage of the invention is that a fleet of UAVs is able to very quickly scout and apply herbicides autonomously to regions on the agricultural field with the benefit that a whole field can be treated in a relatively short time. The work rate depends on the number of UAVs, a fleet of twenty UAVs can simultaneously treat twenty different regions within the target field, while a fleet of forty can treat forty different regions and can have a work rate two times higher. A further advantage of the invention is that it can quickly treat agricultural fields with herbicides only applied to the target areas, and thus minimising application to non-target areas. This is a much more effective way to apply herbicides to targets and significantly reduces the amount of herbicides that are applied to agricultural fields without reducing the performance. This has benefits both for the environment and for the reduction of residue levels in agricultural produce. A benefit of this is that the quantity of herbicides that need to be carried by the application device also decreases, for example from the range of litres/ha down to the order of about 100 to 10 ml/ha where the required quantity can be readily carried by a fleet of several UAVs. Also, since weed issues occur continuously throughout the growing season, an advantage of the invention is that it can quickly revisit agricultural fields to repeat the treatment, for example on a 5-10 day cycle to ensure that target weeds are treated during their optimum growth stage (for example 2-5 leaf stage). This additionally reduces the active ingredient requirements as early growth stage weeds are easier to control than later stages. Also, successful biocontrol of weeds often needs close attention to application window. Also, to spray a field with a boom sprayer fitted to a tractor has a high treatment cost, including the time of the driver; has a high energy consumption with correspondingly high $CO_2$ emissions; and can cause compaction damage to the soil, especially when the treatment has to be repeated when new weeds emerge.

Figure 6:
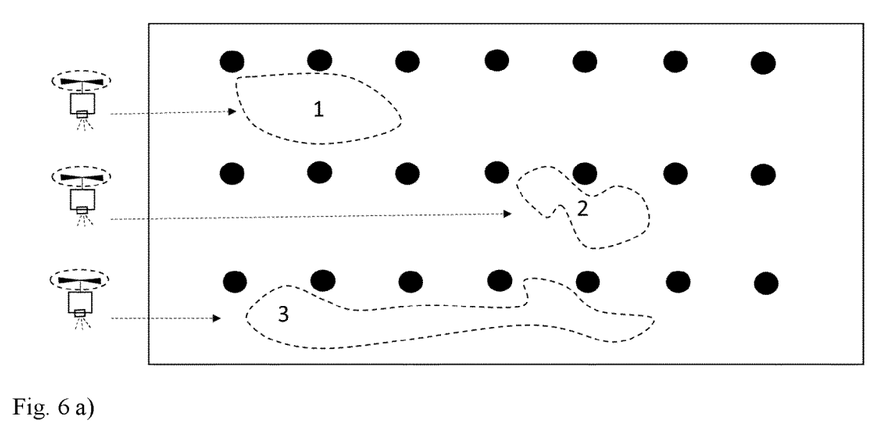

FIG. 6 a) to c) show schematic examples of a plurality of UAVs applying herbicides to an agricultural crop field according to different weed maps (from a top view perspective). In the example of FIG. 6 a) the density and spatial distribution of the weeds identified on the field demands for a patch-wise spray application pattern. In this example, an UAV flies to an identified weed patch within a row of a plurality of crops (shown in black dots) to apply herbicides to weeds within the weed patch only. In the next row a second UAV flies to an identified weed patch within this row and applies herbicides similarly as discusses before. In the third row a third UAV operates in a similar way. In the example of FIG. 6 b) a high number of weeds favours a strip application strategy. Here, for each row an UAV activates its weed control unit to spray herbicides along the whole strip (row). In the example of FIG. 6 c) a low number of weeds favours a target to target application strategy where an UAV flies within a row and applies herbicides specifically to identified weeds within the row. Depending on the growth of weeds on an agricultural field it is also possible that these three strategies are combined with each other. In addition, an UAV does not need to fly necessarily within a row of a plurality of crops and apply herbicides within that row. Other flight- and herbicide application paths e.g. between different rows are also possible In another exemplary embodiment, a computer program or computer program product is provided that is characterized by being configured to execute the method steps of the method according to one of the preceding embodiments, on an appropriate system.

The computer program product might therefore be stored on a computer unit, which might also be part of an embodiment. This computing unit may be configured to perform or induce performing of the steps of the method described above. Moreover, it may be configured to operate the components of the above described UAV, base station and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention. Further on, the computer program product might be able to provide all necessary steps to fulfil the procedure of an exemplary embodiment of the method as described above.

According to a further exemplary embodiment of the present invention, a computer readable medium, such as a CD-ROM, USB stick or the like, is presented wherein the computer readable medium has a computer program product stored on it which is/can be a computer program product as described by the preceding section. A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network.

According to a further exemplary embodiment of the present invention, a medium for making a computer program product available for downloading is provided, which computer program product is arranged to perform a method according to one of the previously described embodiments of the invention.

It has to be noted that embodiments of the invention are described with reference to different subject matters. In particular, some embodiments are described with reference to method type claims whereas other embodiments are described with reference to the UAV, base station and/or system type claims. However, a person skilled in the art will gather from the above and the following description that, unless otherwise notified, in addition to any combination of features belonging to one type of subject matter also any combination between features relating to different subject matters is considered to be disclosed with this application. While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

What is claimed is:

1. An unmanned aerial vehicle (UAV) for agricultural field management, comprising:
   a control and processing unit; and
   a camera;
   wherein, the control and processing unit is configured to control the UAV to fly to a location inside a canopy of a crop of an agricultural field and below a vertical height of the crop and/or between rows of a plurality of crops of an agricultural field and below a vertical height of the plurality of crops;
   wherein, the control and processing unit is configured to control the camera to acquire at least one image relating to the ground at the location inside the canopy of the crop and below the vertical height of the crop and/or between the rows of the plurality of crops and below the vertical height of the plurality of crops;
   wherein the control and processing unit is configured to analyze the at least one image to determine the presence of at least one weed and its location on the ground; and
   wherein the control and processing unit is configured to analyze the at least one image to determine a weed map, wherein the weed map classifies the presence of weeds on the ground according to their density and spatial distribution.

2. The UAV according to claim 1, wherein the at least one image comprises a plurality of images and wherein the processing and control unit is configured to control the camera to acquire the plurality of images at a corresponding plurality of different positions relative to the ground inside the canopy of the crop and below the vertical height of the crop and/or between the rows of the plurality of crops and below the vertical height of the plurality of crops.

3. The UAV according to claim 1, wherein the UAV has a maximum size in the order of magnitude of 1 to 20 cm, and a weight equal or below 200 g.

4. The UAV according to claim 1, wherein the UAV further comprises:
   propeller guards;
   wherein the propeller guards are configured to at least partially surround propellers of the UAV.

5. The UAV according to claim 1, wherein the UAV further comprises:
   at least one weed control unit;
   wherein the at least one weed control unit is configured to be activated at a location determined by the control and processing unit based on the image analysis for the presence of at least one weed and its location.

6. The UAV according to claim 5, wherein the UAV further comprises a transceiver;
- wherein the control and processing unit is configured to utilize the transceiver to transmit information about the at least one image relating to the ground and/or the image analysis of the at least one image relating to the ground, and the at least one location associated with the camera when the at least one image relating to the ground was acquired;
- wherein the control and processing unit is configured to receive an instruction to fly to at least one location where at least one weed has been determined and to activate the at least one weed control unit at the at least one location;
- wherein the instruction is based on the at least one image relating to the ground and/or the image analysis of the at least one image relating to the ground as transmitted by the transceiver.

7. The UAV according to claim 1, wherein the UAV further comprises location determining means;
- wherein the location determining means is configured to provide the control and processing unit with at least one location associated with the camera when the at least one image relating to the ground was acquired.

8. A base station for a plurality of UAVs, wherein the base station comprises:
- an UAV parking unit comprising at least one UAV;
- a base station control and processing unit;
- at least one base station transceiver;
- wherein the at least one UAV comprises:
  - a control and processing unit;
  - a camera and
  - a transceiver;
- wherein the UAV parking unit is configured to carry a plurality of UAV;
- wherein, the control and processing unit is configured to control the UAV to fly from the base station to a location within a canopy of a crop and below a vertical height of the crop and/or between rows of a plurality of crops and below a vertical height of the plurality of crops;
- wherein, the control and processing unit is configured to control the camera to acquire at least one image relating to the ground at the location within the canopy of the crop and below the vertical height of the crop and/or between the rows of the plurality of crops and below the vertical height of the plurality of crops;
- wherein the control and processing unit is configured to utilize the transceiver to transmit information about the at least one image relating to the ground to the base station;
- wherein the base station control and processing unit is configured to utilize the at least one base station transceiver to receive the information about the at least one image relating to the ground from the at least one UAV;
- wherein the base station control and processing unit is configured to analyze the at least one image received from the at least one UAV to determine the presence of at least one weed and its location on the ground and to determine a weed map, wherein the weed map classifies the presence of weeds on the ground according to their density and spatial distribution.

9. The base station according to claim 8, wherein the at least one UAV further comprises location determining means;
- wherein the location determining means is configured to provide the control and processing unit with at least one location associated with the camera when the at least one image relating to the ground was acquired;
- wherein the control and processing unit is configured to utilize the transceiver to transmit information of the at least one location associated with the camera when the at least one image relating to the ground was acquired;
- wherein the base station control and processing unit is configured to utilize the at least one base station transceiver to receive the information of the at least one location associated with the camera when the at least one image relating to the ground was acquired;
- wherein the base station control and processing unit is configured to analyze the at least one image received from the at least one UAV to determine the presence of at least one weed on the ground at the at least one location.

10. The base station according to claim 9, wherein the at least one UAV further comprises at least weed control unit;
- wherein the base station control and processing unit is further configured to determine an instruction to the at least one UAV to fly to the at least one location where the presence of the at least weed has been determined and to activate the at least one weed control unit at the at least one location.

11. The base station according to claim 10, wherein the at least one UAV includes a plurality of UAVs;
- wherein the base station control and processing unit is configured to analyze the at least one image received from at least one of the plurality of UAVs to determine a weed map, wherein the weed map classifies the presence of weeds on the ground according to their density and spatial distribution;
- wherein the base station control and processing unit is further configured to determine a flight path map for the plurality UAVs as a function of the weed map and the classification of the weeds according to their density and spatial distribution on the ground;
- wherein the base station control and processing unit is further configured to determine instructions to the plurality of UAVs to fly to the at least one location where the presence of the at least weed has been determined and to activate the at least one weed control unit at the at least one location according to the determined flight path map.

12. The base station according to claim 11, wherein the base station control and processing unit is configured to control the plurality of UAVs to operate in alternating groups such that while one group is out flying the other group is on the UAV parking unit.

13. A system for agricultural weed management, the system comprising the base station according to claim 8 and the at least one UAV.

14. A method for agricultural weed management, comprising:
- flying an UAV to a location within a canopy of a crop in an agricultural field and below a vertical height of the crop and/or between rows of a plurality of crops in an agricultural field and below a vertical height of the plurality of crops;
- acquiring by a camera of the UAV at least one image relating to the ground at the location within the canopy of the crop and below the vertical height of the crop and/or between the rows of the plurality of crops and below the vertical height of the plurality of crops;

analyzing the at least one image to determine at least one weed and its location on the ground and to determine a weed map, wherein the weed map classifies the presence of weeds on the ground according to their density and spatial distribution.

15. A non-transitory computer-readable storage medium including executable instructions for controlling an UAV which when executed by at least one processor, cause the at least one processor to:
- fly an UAV to a location within a canopy of a crop and below a vertical height of the crop and/or between rows of a plurality of crops and below a vertical height of the plurality of crops;
- acquire by a camera of the UAV at least one image relating to the ground at the location within the canopy of the crop and below the vertical height of the crop and/or between the rows of the plurality of crops and below the vertical height of the plurality of crops;
- analyze the at least one image to determine at least one weed and its location on the ground and to determine a weed map, wherein the weed map classifies the presence of weeds on the ground according to their density and spatial distribution.

* * * * *